United States Patent Office 3,466,138
Patented Sept. 9, 1969

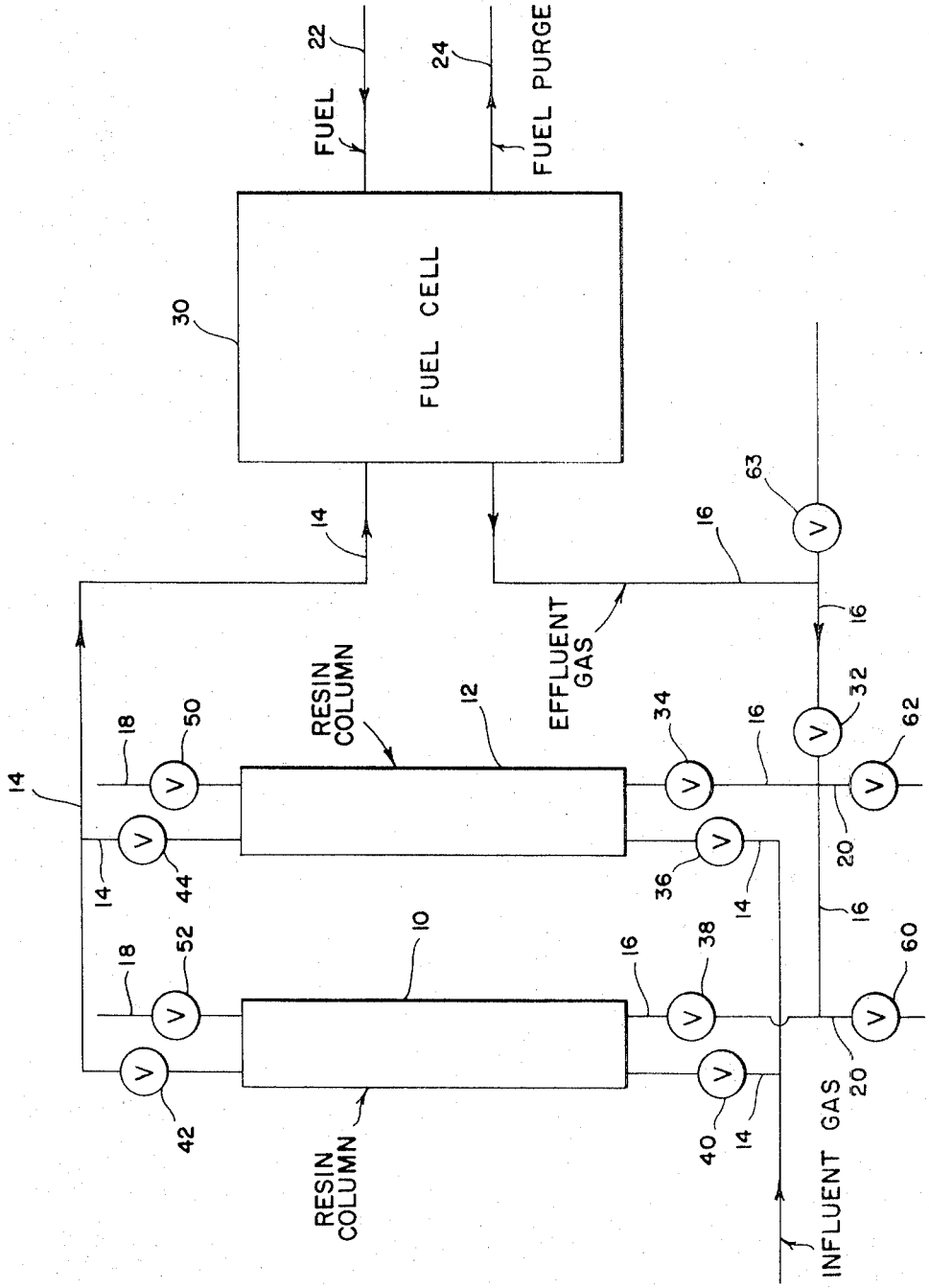

3,466,138
PROCESS AND SYSTEM FOR REMOVAL OF ACIDIC GASES FROM INFLUENT GAS TO FUEL CELL
Kurt S. Spiegler, Richmond, Calif., and Kostas Routsis, East Hartford, Conn., assignors to United Aircraft Corporation, East Hartford, Conn., a corporation of Delaware
Filed June 7, 1966, Ser. No. 555,724
Int. Cl. B01d 37/00
U.S. Cl. 23—2                                                                    7 Claims

ABSTRACT OF THE DISCLOSURE

A process and system are provided for supplying a purified influent, reactant gas to a fuel cell by passing the influent gas through a basic anion exchange resin which absorbs acid gases such as carbon dioxide from the influent gas stream, allowing the purified gas to pass to the fuel cell where it reacts with another reactant to generate the electric current of the cell and give off a hot, humid gaseous reaction effluent. This effluent gas from the fuel cell is used to regenerate the anion exchange resin after its absorptive capacity has been exhausted. Two resin columns are preferably connected with both the influent gas inlet to the fuel cell and the effluent gas outlet from the fuel cell through suitable control means which allow the influent gas to be passed through one source of anion exchange resin for purification while the effluent gas from the cell is passed through the other source of anion exchange material to regenerate it. The connections are periodically reversed so that one source of resin is constantly being regenerated while the other is purifying influent gas.

---

This invention relates to the removal of acidic gases from influent gas streams to fuel cells. More particularly it relates to a process for removing acidic gases from influent gas streams to a fuel cell by absorption; to a method for regenerating the acid-gas absorber and preparing it for additional absorption; and to a regenerable absorption system.

It is greatly beneficial to remove carbon dioxide ($CO_2$) and other acidic gases from the influent gas streams to fuel cells. The conventional fuel cell operates on the familiar water-forming reaction between hydrogen and oxygen, which generates the desired electrical current. The electrolyte, which is present in the cell to allow and promote the necessary ion flow between the electrodes of the cell, is generally a material which is reactive with acidic gases. For example, potassium hydroxide (KOH) and sodium hydroxide (NaOH) are often used as electrolytes, and both of these materials are highly reactive with $CO_2$ and other acid gases. Thus, if acid gases such as $CO_2$ are allowed to enter the cell, they normally react with the electrolyte and decrease the efficiency and performance of the cell.

As a more specific example of problems resulting from the presence of acid gases in the cell, $CO_2$, which is the most common and most troublesome impurity in fuel cell influent gases, reacts with KOH to produce a potassium carbonate ($K_2CO_3$) precipitate. This precipitate can accumulate at the surfaces of the electrode and block or inhibit the passage of the reactive gases to or through these surfaces. The presence of this $K_2CO_3$ precipitate is highly undesirable because these electrode surfaces are the sites of the liquid-gas interface at which the electron-generating reaction between the fuel gas and the oxidizing gas (i.e., generally hydrogen and oxygen, respectively), takes place. The formation and collection of such precipitates at the electrode surfaces also can prevent the desired maze-type flow of the gases into and through the electrode to the liquid-catalyst-gas interface.

The primary purification problem encountered in the pretreatment of fuel cell influent gases is the removal of $CO_2$ from these gases. It should be understood, however, that it may also be necessary to remove other acidic gases, such as, for example, sulfur dioxide ($SO_2$), sulfur trioxide ($SO_3$), and hydrogen sulfide ($H_2S$) from such influent gas streams. This invention contemplates the removal of all such acid gases generally. Thus, although the invention, for the sake of convenience and brevity, will be described largely in terms of its application to $CO_2$ removal, general application to all undesirable acid gas impurities in the influent gas stream is intended.

It may be necessary to use the process of this invention to pretreat either the oxidizing gas (generally, oxygen or air) supplied to the cathode of the fuel cell, the fuel gas (generally, hydrogen) supplied to the anode of the cell, or both. The treatment of either or both such influent streams is contemplated by this invention.

In most instances, the fuel gas, or hydrogen, is supplied from a purified source (such as, pure hydrogen), obviating the need for influent gas pretreatment. In some cases, however, the hydrogen or other fuel gas may be supplied from a reformer or the like, such as for example, where hydrogen is produced by methane decomposition. Fuel gas from such sources may contain carbon dioxide and the other acid gas impurities which are beneficially removed from the influent gases before they are introduced into the fuel cell.

Most purification problems, however, lie in removal of $CO_2$ from the influent oxidizing gas supplied to the fuel cell cathode. The oxidizing gas normally used is air. Air is a greatly preferred oxidizing gas, because of its abundance, ready availability, and low cost. Carbon dioxide, of course, is always present in air, and hence the problem of its removal always exists when air is used as the oxidizing gas.

Various methods and systems have been proposed in the prior art for the removal of $CO_2$ from fuel cell influent gases. Absorbents of the soda-lime class have been used for this purpose, but these absorbents are not regenerable and must be discarded when their absorptive capacity is exhausted. Certain regenerable $CO_2$ absorbents have also previously been proposed. Exemplary are molecular sieves and solutions of ethanol amine and other similar compounds. Although these absorbents do have the advantage of being regenerable, they also have undesirable shortcomings.

Molecular sieves absorb water vapor as well as $CO_2$. Because of the high ratio of water vapor to $CO_2$ in air, the absorptive sites of the molecular sieves become largely tied up by water rather than $CO_2$, and the $CO_2$ absorption efficiency of the sieves is reduced substantially. The use of solutions for such absorption is not satisfactory, because their use requires the presence of tall counter-current scrubbing towers with associated pumps and other incidental space and weight consuming equipment. These bulky equipment requirements are particularly unsatisfactory in small installations where fuel cells may be of particular interest.

Accordingly, to overcome the foregoing disadvantages of prior art procedures, it is a primary and general object of the present invention to provide a new and improved process for removing $CO_2$ and other acid gases from influent gas streams to fuel cells.

Another object of this invention is to provide a new and improved process for removing acid gases from the influent gas streams to fuel cells with a regenerable acid gas absorber.

A further object of this invention is to provide an improved process for removing acid gases from fuel cell influent gas streams by absorption, which process includes regeneration of the acid gas absorber.

A still further object of this invention is to provide an improved process and system for the removal of acid gases from a fuel cell influent gas stream in which a continuous source of acid gas absorption is provided by regeneration of a portion of the acid gas absorber while the remainder of the absorber is removing the acid gas from the influent stream.

Yet another broad object of this invention is to provide an improved apparatus or system for removing $CO_2$ and other acid gases from fuel cell influent gas streams.

A further object of this invention is to provide an improved apparatus or system for removing acid gases from fuel cell influent gas streams, which system includes an improved regenerable absorber material for the removal of such gases.

A still further object of this invention is to provide an improved process and an improved system or apparatus for the removal of acid gases from fuel cell influent gas streams which utilize effluent gases from the fuel cell to regenerate the acid gas absorber material.

Additional objects and advantages of this invention will be set forth in part in the description that follows, and in part will be obvious from the description, or may be learned by practice of the invention, the objects and advantages being realized and attained by means of the methods, processes, apparatus, and systems particularly pointed out in the appended claims.

To achieve the foregoing objects, and in accordance with its purpose, this invention provides a process for removing $CO_2$ and other acid gases from fuel cell influent gas streams using a basic anion exchange resin as the absorber material. The influent gas stream is brought into intimate contact with the basic anion exchange resin before the gas enters the fuel cell, and a substantial portion of the $CO_2$ or other acid gas in the gas stream is absorbed by the resin and thereby removed from the influent stream before it reaches the fuel cell.

The present process provides for regeneration of the acid gas absorber after its absorptive capacity has been partially or wholly exhausted. This regeneration is achieved by contacting the basic anion exchange resin with a hot, humid purge gas which purges the absorbed acid gas from the resin, rendering the resin capable of further acid gas absorption.

This invention also provides a regenerable acid gas absorber system for removing $CO_2$ and other acid gases from influent gas streams to fuel cells.

In addition to the description herein, this invention is further illustrated by the accompanying drawing which is a block diagram schematically illustrating the process and system of this invention.

In a preferred embodiment, as illustrated in the drawing, the regenerable $CO_2$ absorber system and process of this invention are based on two resin columns 10 and 12 containing basic anion exchange resin. It will be understood that the term "column" is meant to include any suitable source or supply of such resin.

These resin columns are each connected to a gas inlet of fuel cell 30 by influent gas transfer means which also connects the columns with a source of the desired influent gas. Any suitable influent gas transfer means such as the conduit 14 of the drawing can be used for these purposes. Of course, separate transfer means of any other suitable influent gas transfer system can be used to: (a) transport the gas from an external source to the resin colum 10 or 12 and (b) transport the purified gas from the column to the fuel cell.

Each resin column 10 and 12 is also connected with one or more purge gas transfer means. The purge gas transfer means can connect the resin columns with an external source of purge gas or can connect the resin columns with a gas outlet of the fuel cell itself, if the outlet is exiting an effluent gas suitable for use in purging the resin in the columns.

In the embodiment of the invention illustrated in the drawing, each of the resin columns 10 and 12 is connected to dual sources of purge gas, i.e., they both are connected to an external source of purge gas by purge gas conduits 20 which lead into the resin columns through the terminal portions of conduit 16; and they are also connected to the fuel cell effluent gas outlet directly by conduit 16. Again the particular embodiment illustrated in the drawing is illustrative only, and any suitable purge gas transfer system can be used: (a) to connect each of the resin columns with a source of hot purge gas and (b) to cause passage of the purge gas through the resin in the columns.

In accordance with the invention, the purge gas is brought into intimate contact with the resin to purge previously absorbed $CO_2$ from the resin and thereby prepare it for further $CO_2$ absorption.

Again referring to the drawing, outlet conduits 18 from resin columns 10 and 12 are exemplary of the purge gas exhaust means that can be used to allow the purge gas, containing $CO_2$ liberated from the resin, to be discharged from the resin columns.

In accordance with the invention, the regenerable $CO_2$ absorber system includes regulating means operably associated with both the influent gas transfer system described above and the purge gas transfer system. As embodied, this regulating means is illustrated by the valving system shown in the drawing. Any suitable regulating means can be used (a) to operatively connect one or more resin columns with the influent gas transfer system and to disconnect them from the purge gas transfer system, and (b) to operatively connect the remaining resin column or columns with the purge gas transfer system and to disconnect them from the influent gas transfer system.

Such regulating means can be repeatedly and reversibly actuated to break and reestablish the respective connections between each of the resin columns and either of the gas transfer systems, so that the resin in at least one column always is removing $CO_2$ from the influent gas stream before its introduction into the fuel cell, while the resin in the remaining column or columns is simultaneously being purged of $CO_2$ previously absorbed by the resin in those columns, and prepared for subsequent additional $CO_2$ absorption. The regulating means can thus be reversed at desired intervals to reverse the connections in the system to connect the previously absorbing resin column with the purge gas transfer system and the previously purged resin column with the influent gas transfer system.

The operation of a preferred embodiment of the regulating means or system, and indeed of the entire absorber system of this invention is illustrated by reference to the drawing. In the particular embodiment there shown, the absorber system is connected to the oxidizing gas side of the fuel cell in a manner suitable for the pretreatment of the oxidizing influent gas stream for removal of $CO_2$ from that stream in accordance with this invention.

Impure air is introduced into the system through conduit 14 from an external source (not shown).

Valves 40 and 42 are opened and valves 36 and 44 are closed to cause the influent gas to pass through resin column 10 but not to enter resin column 12. On exiting column 10 the purified influent gas reenters conduit 14 in which it is transported to the oxidizing gas inlet of fuel cell 30.

In accordance with the invention, while the influent gas stream is being purified in column 10, previously absorbed $CO_2$ is being purged from resin column 12 using the effluent gas from fuel cell 30 as the purge gas. This purge gas is transported from the fuel cell effluent gas outlet to resin column 12 in conduit 16 by opening valves 32 and 34 and closing valve 38. Valve 50 is opened to allow the purge gas, containing the $CO_2$ purged from the resin in column 12 to exit from the column. This exiting gas stream can be vented to the atmosphere, passed to a heat exchanger, or used for any other suitable purpose.

When the $CO_2$ absorbing capacity of the resin in column 10 has been depleted and the resin in column 12 has been sufficiently purged of $CO_2$, valves 34, 40, 42 and 50 are closed, and valves 36, 38, 44 and 52 are opened. This modification in the arrangement of the regulating means causes the influent gas stream to be passed through resin column 12 for absorption of $CO_2$ by the regenerated resin in that column and resin column 10 to be purged of previously absorbed $CO_2$ by the effluent purge gas from the fuel cell.

If a purge gas from an external source (not shown) is used to purge the $CO_2$ from one of the resin columns, valve 60 or 62 is opened to allow the purge gas to pass into either column 10 or 12, as desired. If purge gas from an external source is used, the fuel cell effluent gas can be eliminated from the purge gas system, if desired, by closing valve 32 and opening valve 63 to vent the fuel cell effluent gas to the atmosphere, or to pass it to a heat exchanger or the like (not shown).

The drawing also shows fuel gas influent line 22 and fuel gas purge line 24 for fuel cell 30. It will be understood that a regenerable acid-gas absorber system similar to that described above can be connected to the fuel side of fuel cell 30 in much the same manner as described above for the oxidizing gas side of the fuel cell, if such a connection is desired. The process and system of this invention thus can be used to remove $CO_2$ and other acid gases from either or both the oxidizing influent gas stream and the fuel influent gas stream to the fuel cell.

For the reasons pointed out earlier, however, the process and absorber system of this invention are of primary importance in purifying air influent streams to the oxygen electrodes of fuel cells.

It will be understood that more than two resin columns can be used in the process of this invention and in the regenerable $CO_2$ absorber system described above. Thus in such a process or system, more than one resin column can at any given time be absorbing $CO_2$ from the influent gas stream and more than one additional resin column can, at that time, be under exposure to purge gas for removal of $CO_2$ previously absorbed in those columns. A process or system using only two resin columns is normally preferred because of size and weight limitations and the like considerations.

The process of this invention is particularly important in its provision for regeneration of the $CO_2$ absorber. The $CO_2$ is removed from the influent gas stream to the fuel cell by bringing that influent stream into intimate contact with the basic anion exchange resin before the influent gas enters the fuel cell. This resin absorbs a portion of the $CO_2$ from the influent stream, producing a resultant purification of the stream. The $CO_2$ absorbing resin, however, must be regenerated periodically, and provision is made for such regeneration in this process by periodically withdrawing the resin from contact with the influent gas stream and contacting the resin, and the $CO_2$ absorbed in it with the hot, humid purge gas. This purge gas drives off or purges the previously absorbed $CO_2$ from the resin in gaseous form, thereby regenerating the resin and preparing it for additional $CO_2$ absorption.

A hot and humid purge gas should be used. It can be supplied from an external source, but can also be an effluent gas from the fuel cell. Steam normally is used as an external purge gas, but, of course, other suitable gases from external sources can also be used.

The residue of the air used as the oxidizing gas in the fuel cell is exemplary of a fuel cell effluent gas which can be used as a purge gas. When air is supplied to the fuel cell, the oxygen present therein reacts with the hydrogen or other fuel in the cell to produce the desired electrical current. This leaves a fuel cell effluent gas which contains largely nitrogen, some unused oxygen, and water vapor. This effluent gas is generally hot and humid and can be used satisfactorily as a purge gas to regenerate the acid-gas absorber in accordance with the process of this invention.

It is generally more economical, and hence preferred, to use the effluent gas from the fuel cell rather than steam or another gas from an external source as the purge gas. These fuel cell effluent gases are already present in the basic fuel cell system, and their use as purge gas allows them to be put to a useful function.

The purge gas exiting from the resin column is identical in character to the entering purge gas except for a higher $CO_2$ or other acid gas content. Hence, the heat content of the exiting purge gas can be effectively utilized in a heat exchanger or reformer, or for any other desired purpose.

The particular purge gas used should, of course, be introduced into the $CO_2$ absorber at a temperature below the breakdown temperature of the anion exchange resin being used. Normally the purge gas temperature can vary between about 70° C. and about 100° C. and still achieve the desired desorption and regeneration. Purge gas temperatures between about 80° C. and about 100° C. are preferred.

The anion exchange resin used in the system and in accordance with the process of this invention is in the free base form. The resin must be basic and preferably is weakly basic. Acidic ion exchange resins are not suitable because they do not have the necessary acid gas absorptive properties.

It is also necessary that the particular resin selected not break down at the elevated temperatures necessary in the desorption and regeneration step of the process of this invention.

The basic anion exchange resins used in this invention are preferably macroreticular. A macroreticular resin is one which has pores larger than molecular size. Thus, it has a highly porous structure and lends itself more readily to diffusion of the $CO_2$ and other acid gases throughout the resin. Macroreticular resins are also preferred because they present a greater surface area for absorption than non-macroreticular resins, have good resistance to shrinkage in air, and have desirable high temperature characteristics, i.e., good resistance to breakdown at elevated temperatures.

Exemplary of the basic anion exchange resins suitable for use in this invention are Amberlyst XN–1002 and Amberlite IRA–68, both produced by Rohm & Haas Co. of Philadelphia, Pa. Amberlyst XN–1002 is macroreticular quaternary amine type resin, while Amberlite IRA–68 is a weakly basic, cross-linked acrylic anion exchange resin containing only tertiary amine functional groups. Amberlite IRA–68 does not normally exist in macroreticular form, but it can be produced in that form, and, for the purposes of this invention, it can be used satisfactorily in either its normal or its macroreticular form. Both of these resins are converted to the free-basic form for use in this invention by treatment with ammonia, ammonium hydroxide, sodium hydroxide or another similar strong base.

Without being limited to any particular theory, it is believed that the $CO_2$ (or other acid gas) absorption step of this process results from the formation of a bicarbonate or similar complex between the $CO_2$ and the basic anion exchange resin. When the hot, humid purge gas is passed through the resin during the desorption and regeneration step, the bicarbonate-forming reaction is reversed, releasing the previously absorbed $CO_2$ to the atmosphere as a gas and leaving the resin in its original form, ready for reuse in additional $CO_2$ absorption.

In summary, the process of this invention can be used to remove $CO_2$ and other acid gases, such as $H_2S$ and $SO_2$ from either the influent oxidizing gas stream or the influent fuel gas stream to a fuel cell. Normally this process is used to purify the oxidizing gas, generally air. The $CO_2$ and other acid gases are removed from influent gas streams to fuel cells by absorption with a basic anion exchange resin, preferably a weakly basic macroreticular resin. While one source of the resin is performing this absorption step, another source of the resin, which has previously absorbed up to its normal capacity of $CO_2$, is regenerated by contacting it with a hot, humid purge gas. By alternating the sources of the resin in complementary absorption and regeneration cycles, a continuous $CO_2$ absorption process can be provided.

It will be understood that the process and system of this invention can be used in conjunction with any of the well-known types of fuel cells, including, but not by way of limitation, compact cells, Bacon-type cells and high temperature cells.

For a clearer understanding of the invention, a specific example of it is set forth below. This example is merely illustrative, and is not to be understood as limiting the scope and underlying principles of the invention in any way.

EXAMPLE

In this example, a sample of Amberlyst XN-1002 basic anion exchange resin was converted to free-base form by treatment with a suitable solution of sodium hydroxide. The resulting resin was rinsed with water and dried with nitrogen. The dry resin had a density of 0.43 g./cm.$^3$, bulk volume.

A resin column 4.7 cm. in diameter and 17 cm. high was filled with 127 grams of the resin in the free-base form. Air at 23° C. and 80% relative humidity was passed through the column at a flow rate of 1.0 liter per minute. The air was brought into intimate contact with the resin in the column. The $CO_2$ content of the influent air prior to entering the column was an average of 320 p.p.m. by volume. The $CO_2$ content of the effluent air from the resin column (the purified fuel cell influent gas) did not exceed 2 p.p.m. by volume for about 37 hours, at which time a sharp $CO_2$ breakthrough occurred and the $CO_2$ content of the column effluent gas rapidly rose to equal that of the column influent gas. Before this breakthrough occurred, about 2200 liters of air had been purified.

After the breakthrough occurred, the resin was regenerated by passing 1000 grams of steam (at 100° C.) at a flow rate of ten (10) liters per minute through the column. After this purge step was completed, the resin in the purged column was dried with nitrogen, and was found to be ready for additional $CO_2$ absorption. The absorption-regeneration cycle was repeated up to twelve times on the same resin sample, and the sample was found to be in condition for additional absorption of about the original amount of $CO_2$ (i.e., purification of about 2200 liters of air) following each regeneration step.

This invention in its broader aspects is not limited to the specific details shown and described, but departures may be made from such details within the scope of the accompanying claims without departing from the principles of the invention and without sacrificing its chief advantages.

We claim:
1. A process for supplying a purified, influent, reactant gas stream to a fuel cell, which comprises:
   (a) bringing the influent gas stream into intimate contact with a first source of a basic anion exchange resin before the influent gas stream enters the fuel cell, to effect absorption of acid gas present in said influent gas stream by said resin and thereby remove the acid gas from said influent gas stream;
   (b) passing the purified influent reactant gas stream into the fuel cell and reacting it with another reactant to generate the current of the cell and yield a hot, humid reaction effluent gas;
   (c) periodically withdrawing the first source of resin from contact with the influent, reactant gas stream and bringing said influent gas stream into intimate contact with a second source of basic anion exchange resin before it is passed into the fuel cell, while simultaneously contacting the first source of said resin with the hot, humid reaction effluent gas from the fuel cell to purge the absorbed acid gas from said first source of resin and regenerate said first source of resin for further acid gas absorption; and
   (d) alternately passing the influent, reactant gas stream to the fuel cell and the hot, humid effluent gas from the fuel cell through said first and second sources of resin, so that one of said sources of resin is removing acid gas from said influent stream while the other source of resin is being regenerated by said effluent gas, to thereby provide a continuous supply of purified influent, reactant gas to the fuel cell.

2. The process of claim 1 in which the basic anion exchange resin is macroroeticular.

3. The process of claim 1 in which the influent, reactant gas stream to the fuel cell is air supplied to the cell as an oxidant reactant and the acid gas removed from the stream is primarily $CO_2$.

4. A fuel cell system which includes a regenerable acid gas absorber for purification of an influent, reactant gas stream to a fuel cell, which system comprises:
   (a) a fuel cell which generates an electric current by the reaction of an oxidant reactant and a fuel reactant;
   (b) at least two resin columns containing basic anion exchange resin;
   (c) influent, reactant gas transfer means connecting each of said resin columns with a source of influent, reactant gas and also connecting each of said columns with reactant gas inlet means of the fuel cell, whereby influent, reactant gas passing through said influent gas transfer means can be passed through and brought into intimate contact with the basic anion exchange resin in any of said resin columns and the purified, influent, reactant gas can be passed from said resin column into the fuel cell to react with another reactant to generate the current of the cell and yield a hot, humid reaction effluent gas;
   (d) purge gas transfer means connecting each of said resin columns with effluent gas outlet means of the fuel cell, whereby the hot, humid effluent gas from the fuel cell can be passed through and brought into intimate contact with the basic anion exchange resin in any of said resin columns; and
   (e) regulating means operably associated with said influent gas transfer means and with said purge gas transfer means, which regulating means can be repeatedly and reversibly actuated to break and reestablish the connection between any of said columns and either of said transfer means;

whereby said regulating means can be actuated: (1) to connect at least one of said resin columns with said influent gas transfer means to remove acid gas from said influent gas before its introduction into the fuel cell, and (2) to connect at least one of the remaining columns with said purge gas transfer means to transfer the effluent gas from the fuel cell to said column and purge from said column acid gas previously absorbed by the resin therein; and whereby said connection can thereafter be reversed to connect the absorbing resin column with said purge gas transfer means and the purged resin column with said influent gas transfer means.

5. The fuel cell system of claim 4 which includes two resin columns containing basic anion exchange resin, whereby, in operation, one of said columns is connected to said influent gas transfer means to absorb acid gas from the influent gas stream to the fuel cell and the remaining column is connected to said purge gas transfer means to purge previously absorbed acid gas from said remaining column.

6. The fuel cell system of claim 4 in which said basic anion exchange resin is macroreticular.

7. The fuel cell system of claim 4 in which the purge gas transfer means connects each of said columns with both the effluent gas outlet means of the fuel cell and with an external source of purge gas.

References Cited

UNITED STATES PATENTS

| | | | |
|---|---|---|---|
| 2,713,077 | 7/1955 | Rieve | 23—150 X |
| 3,186,789 | 6/1965 | Ward et al. | 23—2 |
| 3,284,531 | 11/1966 | Shaw et al. | 23—2 |
| 3,380,800 | 4/1968 | Marten | 23—2 |

OTHER REFERENCES

Cole et al.; Indust. & Engineer Chem., vol. 52, #10 (October 1960), pp. 859–860.

OSCAR R. VERTIZ, Primary Examiner

E. C. THOMAS, Assistant Examiner

U.S. Cl. X.R.

136—86; 23—4